(12) United States Patent
Narasimha

(10) Patent No.: US 7,206,578 B2
(45) Date of Patent: Apr. 17, 2007

(54) APPARATUS AND METHOD FOR SYSTEM SELECTION

(75) Inventor: Murali Narasimha, Grayslake, IL (US)

(73) Assignee: Motorola Inc., Schaumburg, IL (US)

( * ) Notice: Subject to any disclaimer, the term of this patent is extended or adjusted under 35 U.S.C. 154(b) by 178 days.

(21) Appl. No.: 10/853,393

(22) Filed: May 25, 2004

(65) Prior Publication Data

US 2005/0266844 A1    Dec. 1, 2005

(51) Int. Cl.
*H04Q 7/20* (2006.01)
*H04Q 7/00* (2006.01)

(52) U.S. Cl. .............. 455/435.2; 455/552.1; 455/336; 455/432.1; 370/331

(58) Field of Classification Search ......... 455/435.2, 455/552.1; 370/331
See application file for complete search history.

(56) References Cited

U.S. PATENT DOCUMENTS 5,708,658 A * 1/1998 Sugita ..................... 370/335
5,754,542 A * 5/1998 Ault et al. ................ 370/342
6,961,583 B2 * 11/2005 Moles et al. ............. 455/552.1
2003/0083064 A1 * 5/2003 Cooper .................... 455/432
2004/0236849 A1 * 11/2004 Cooper et al. ............ 709/224
2005/0007977 A1 * 1/2005 Jou ......................... 370/328

FOREIGN PATENT DOCUMENTS

WO    WO 99/21392    4/1999

* cited by examiner

*Primary Examiner*—William Trost
*Assistant Examiner*—Ariel Balaoing
(74) *Attorney, Agent, or Firm*—Matthew C. Loppnow

(57) ABSTRACT

An apparatus and method of system selection. A synchronization channel is received. A synchronization channel message received on the synchronization channel is decoded. An acquisition assistance channel is received. An advanced services information message received on the acquisition assistance channel is decoded. A system is selected based on the advanced services information message.

22 Claims, 4 Drawing Sheets

APPARATUS AND METHOD FOR SYSTEM SELECTION

BACKGROUND

1. Field

The present disclosure is directed to a method and apparatus for system selection. More particularly, the present disclosure is directed to system selection based on the availability of advanced services at a location.

2. Description of Related Art

Presently, an increasing variety of specialized services are being made available on cellular networks. These services are often not available on networks of all operators and are not available within all parts of a given operators network. For example, a mobile station, such as a code division multiple access end-user device, that frequently accesses a particular advanced service that is not ubiquitous can often find itself in a system where the service is not available. That is, the mobile station will acquire the system and go into an idle state. It will then obtain information on the paging channel about available advanced services on that system. Unfortunately, if the service the mobile station is seeking is not available on that system, the mobile station must perform system reselection. System reselection is a tedious process and during this process the mobile station is unable to receive any incoming calls. Thus, the mobile station can end up spending too much time scanning for and acquiring systems that do not provide the service the mobile station is looking for because information about the available services and/or features does not become available to the mobile station until it receives the paging channel overhead messages. Because the mobile station spends a significant amount of time acquiring service, this can result in missed pages, unsuccessful origination, and a generally unfavorable user experience. Also, the reselection and redirection of mobile station to alternate systems lead to increased registrations and this, coupled with registrations for the advanced services, such as broadcast/multicast registration or push-to-talk registration, can degrade cell capacity.

Thus, there is a need for an improved method for system selection that quickly determines the availability of advanced services.

BRIEF DESCRIPTION OF THE DRAWINGS

The embodiments of the present invention will be described with reference to the following figures, wherein like numerals designate like elements, and wherein.

DETAILED DESCRIPTION

Figure 1:
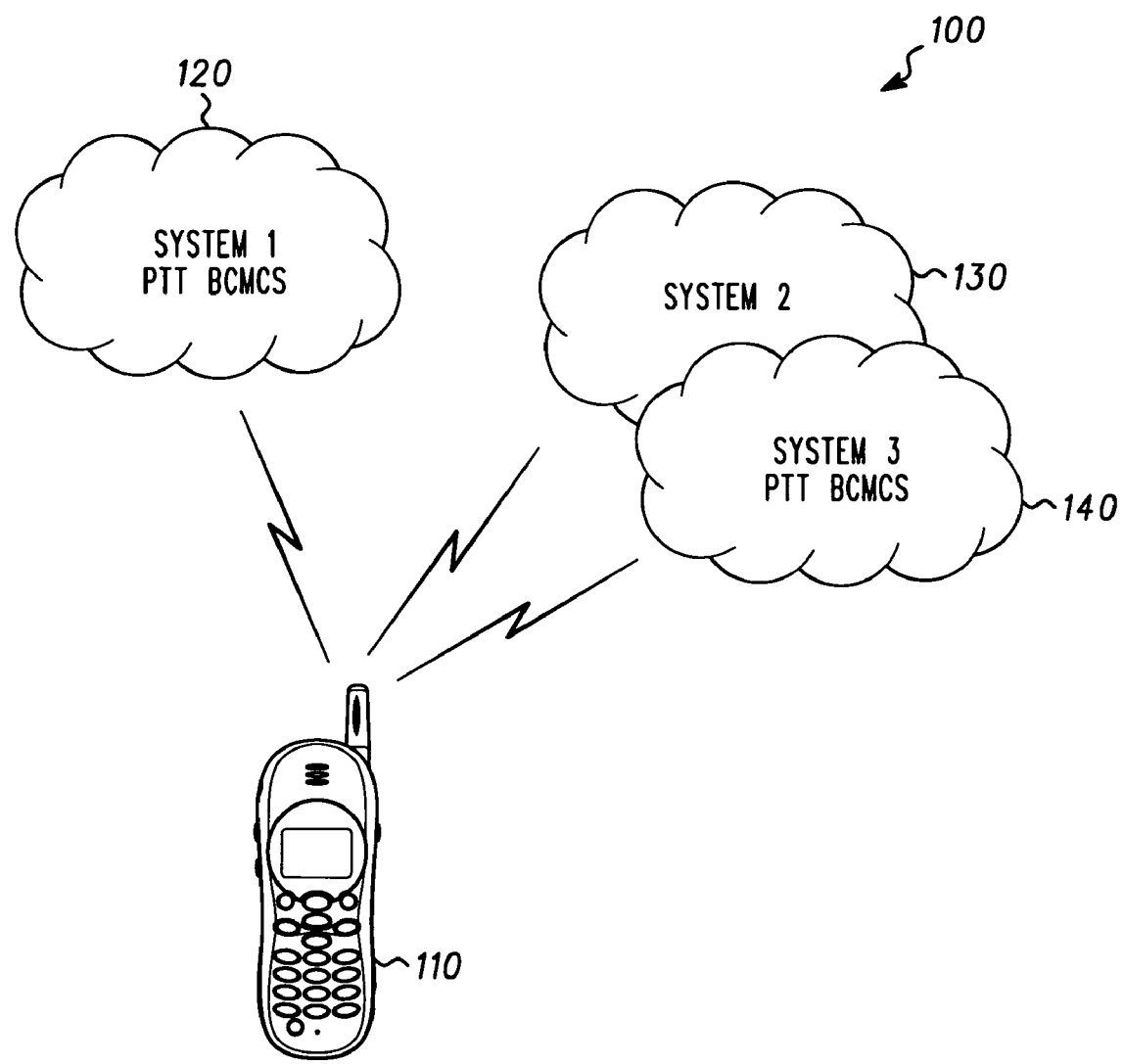
FIG. 1 is an exemplary block diagram of a system according to one embodiment.

FIG. 1 is an exemplary block diagram of a communication system 100 according to one embodiment. The communication system 100 can include one or more terminals 110 a first system 120, a second system 130, and a third system 140. The terminal 110 may be a telephone, a wireless telephone, a cellular telephone, a PDA, a pager, a personal computer, a wireless communication device, or any other device that is capable of sending and receiving communication signals on a network including wireless network.

Each system 120, 130, and 140 may include any type of network that is capable of sending and receiving signals, such as wireless signals. For example, each system 120, 130, and 140 may include a wireless telecommunications network, a cellular telephone network, a satellite communications network, and other like communications systems. Furthermore, each system 120, 130, and 140 may include more than one network and may include a plurality of different types of networks. Thus, each system 120, 130, and 140 may include a plurality of data networks, a plurality of telecommunications networks, a combination of data and telecommunications networks and other like communication systems capable of sending and receiving communication signals.

In operation, the terminal 110 may be operating on a channel the first system 120 using advanced services such as push-to-talk, broadcast/multicast services, or other advanced services. The terminal 110 may engage in a system selection process because it went out of range of the first system 120, because it came within range of the second system 130 because it came within range of the third system 140, and/or it may engage in a system selection process for any other reason. The second system 130 may not have the advanced services desired by the terminal 110 and the third system 140 may have the advanced services desired by the terminal 110. The communication system 100 can allow the terminal 110 to make decisions about the appropriate system to acquire without going through reselection or redirection. It can also allow system selection to adapt to the service the terminal 110 is trying to obtain. For example, the systems 120, 130, and 140 can broadcast information about what advanced services are available on each respective system. It is not necessary to send this information on a paging channel. An acquisition assistance channel can be used instead of a paging channel to broadcast this information. In particular, an acquisition assistance channel can be used to provide information about advanced services. The acquisition assistance channel can have the same physical layer characteristics as a sync channel. For example, it can be spread using a predefined Walsh code. The acquisition assistance channel can also be an encoded, interleaved, spread and modulated signal. According to another example, the acquisition assistance channel frame length can be 26.67 ms and the acquisition assistance channel superframe can consist of 3 channel frames for a total of 80 ms. The acquisition assistance channel can carry an advanced services information message. The advanced services information message can include information such as the availability of a push-to-talk service and any groups that are available or active, such as the availability of broadcast/multicast service and the flows available, such as a list of service options available, and/or other services and relevant information.

The advanced services information message can be transmitted by a base station. The terminal 110 can then use a roaming list to generate a list of channels to scan. For each channel on the scan list, the terminal 110 can tune to a frequency and attempt to acquire a pilot channel, synchronize to pilot pseudorandom noise (PN) code, receive a sync channel and decode the sync channel message to obtain pilot PN offset and time adjustment information. Simultaneously with receiving and decoding the sync channel, the terminal 110 can receive an acquisition assistance channel and decode an advanced services information message on the acquisition assistance channel. The terminal 110 can determine if a desired service or feature is available in the system. For example, a desired service or feature may be a push-to-talk service, a broadcast/multicast service, or any other useful advanced service. If the desired service or feature is not available, the terminal 110 can select a next channel on the scan list and repeat the process. If the desired service is available, the terminal 110 can adjust to a system time at 320 ms after the end of a last sync channel superframe containing a sync channel message, receive paging channel and overhead messages, and determine if the system and/or channel can be used. If it can be used, the terminal 110 operates on the system/channel. If it cannot be used, the terminal 110 can select a next channel on the scan list and repeat the process.

The communication system 100 may thus reduce the time spent by the terminal 110 on system selection when obtaining service. For example, previously, terminal 110 may spend more than a minute looking for service. This time can increase if the terminal 110 selects a system/channel for service and then must redo the selection process when the terminal 110 is later informed an advanced service is unavailable. The communication system 100 can reduce the time spent scanning channels during system selection by allowing a terminal 110 to determine early in the acquisition process whether a system 130 or 140 provides a desired service. If the desired service is unavailable, the terminal 110 can move on to scan other systems/channels without waiting to perform timing adjustment, paging channel reception, and the like.

According to another related embodiment using related interchangeable features with the previous embodiment, for system selection, the terminal 110 can select a current channel, acquire a pilot channel, and synchronize to a pilot pseudorandom noise code. The terminal 110 can then receive a synchronization channel, decode a synchronization channel message received on the synchronization channel, receive an acquisition assistance channel, decode an advanced services information message received on the acquisition assistance channel, and select a system based on the advanced services information message. The terminal may alternately receive the advanced services information message on the synchronization channel, decode the advanced service information message and select the system based on the advanced services information message. The terminal 110 can select a system by determining, from the advanced services information message, if a desired service is available on a current system. If the desired service is available on the current system and the current system can be used, the terminal 110 can select the current system for operation. If a desired service is not available on the current system, the terminal 110 can select another channel and repeat acquiring, synchronizing, receiving a synchronization channel, decoding a synchronization channel message, receiving an acquisition assistance channel, and decoding an advanced services information message. The acquisition assistance channel can be a different channel from the synchronization channel. The acquisition assistance channel can include an encoded, interleaved, spread, and modulated signal. The acquisition assistance channel can also include an acquisition assistance channel superframe having three acquisition assistance channel frames. The acquisition assistance channel can further include an advanced services information message, the advanced services information message including at least one of a push-to-talk service availability, a broadcast multicast service availability, alternate network availability, and a list of service options available. The terminal 110 can receive the synchronization channel and decode the synchronization channel message concurrently with, at a different time from, or separately from, or at any other timing with receiving an acquisition assistance channel and decoding an advanced services information message. According to a related embodiment, the terminal 110 can select a current channel, acquire a pilot channel, synchronize to a pilot pseudorandom noise code, receive a synchronization channel, decode a synchronization channel message received on the synchronization channel, receive an acquisition assistance channel, decode an advanced services information message received on the acquisition assistance channel, and select a system, such as system 130 or system 140, based on the advanced services information message. The acquisition assistance channel can be a different channel from the synchronization channel.

Figure 2:
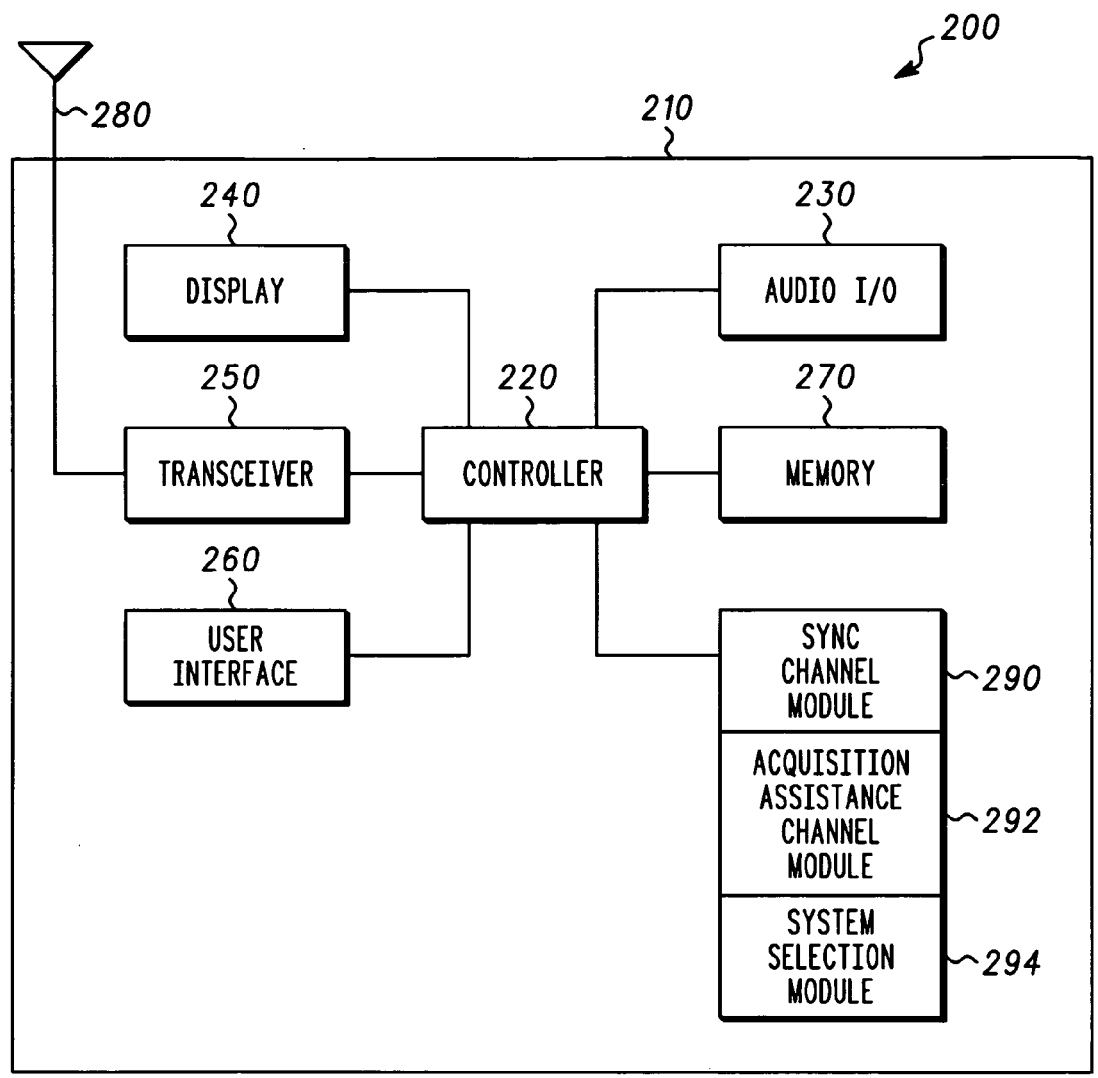
FIG. 2 is an exemplary block diagram of a wireless communication device according to one embodiment.

FIG. 2 is an exemplary block diagram of a wireless communication device 200, such as the terminal 110, according to another related embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a synchronization channel module 290 coupled to the controller 220, an acquisition assistance channel module 292 coupled to the controller 220, and a system selection module 294 coupled to the controller 220. Each of the modules 290, 292, and 294 may be coupled to the controller 220 by being located within the controller 220, by being autonomous from the controller 220, by residing in the memory 270, or by being located anywhere else on the wireless communication device 200. Thus, the modules 290, 292, and 294, may be hardware modules, software modules, a combination of hardware and software, or any other kind of module. The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and a electronic device. The memory 270 may include a random access memory, a read only memory, an optical memory, a subscriber identity module memory, or any other memory that can be coupled to a wireless communication device.

In operation, to perform system selection the transceiver 250 can receive a synchronization channel and an acquisition assistance channel. The controller 220 can control operations of the wireless communication device. The synchronization channel module 290 can decode a synchronization channel message received on the synchronization channel. The acquisition assistance channel module 292 can decode an advanced services information message received on the acquisition assistance channel. According to another embodiment, if an advanced services information message is received on the synchronization channel, the synchronization channel module 290 can decode the advanced services information message received on the synchronization channel. The system selection module 294 can select a system based on the advanced services information message. The controller 220 can be further configured to select a current channel, acquire a pilot channel, and synchronize to a pilot pseudorandom noise code. The system selection module 294 can also determine, from the advanced services information message, if a desired service is available on a current system. The system selection module 294 can further select the current system for operation of the wireless communication device if a desired service is available on the current system and the current system can be used. If a desired service is not available on the current system, the system selection module 294 can select another channel and instruct the wireless communication device 200 to repeat acquiring, synchronizing, receiving a synchronization channel, decoding a synchronization channel message, receiving an acquisition assistance channel, and decoding an advanced services information message. The acquisition assistance channel can be a different channel from the synchronization channel. The acquisition assistance channel can include an encoded, interleaved, spread, and modulated signal. The acquisition assistance channel can also include an acquisition assistance channel superframe having three acquisition assistance channel frames. The acquisition assistance channel can further include an advanced services information message, the advanced services information message including at least one of a push-to-talk service availability, a broadcast multicast service availability, alternate network availability, and a list of service options available. The synchronization channel module 290 can decode the synchronization channel message concurrently with, at a different time from, separately from, or at any other useful timing with the acquisition assistance channel module 292 decoding the advanced services information message.

Figure 3:
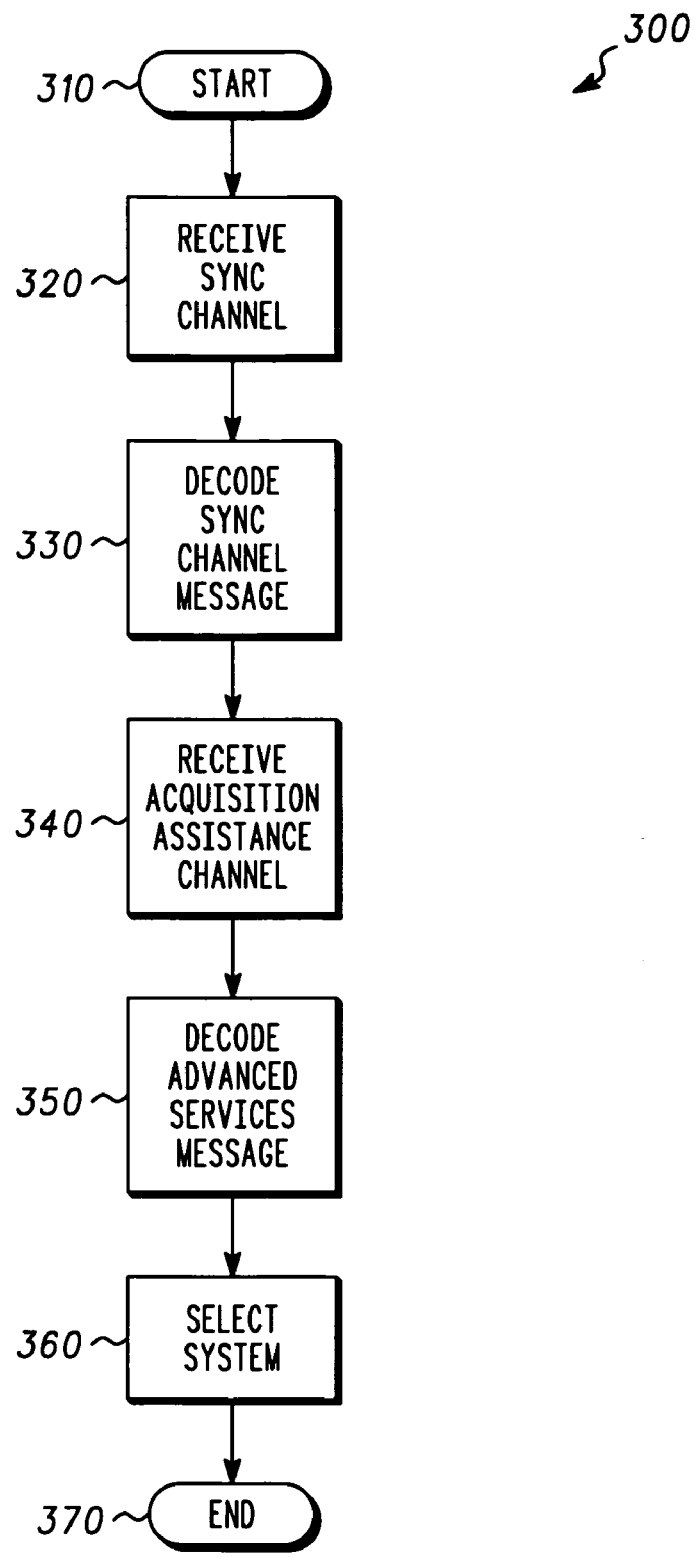
FIG. 3 is an exemplary flowchart illustrating the operation of the wireless communication device according to one embodiment.

FIG. 3 is an exemplary flowchart 300 illustrating the operation of the wireless communication device 200 according to another embodiment. In step 310, the flowchart begins. In step 320, the wireless communication device 200 receives a synchronization channel. In step 330, the wireless communication device 200 decodes a synchronization channel message received on the synchronization channel. In step 340, the wireless communication device 200 receives an acquisition assistance channel. In step 350, the wireless communication device 200 decodes an advanced services information message received on the acquisition assistance channel. Alternately, the wireless communication device 200 can decode an advanced services information message received on the synchronization channel without receiving and acquisition assistance channel. In step 360, the wireless communication device 200 selects a system based on the advanced services information message. In step 370, the flowchart ends.

Figure 4:
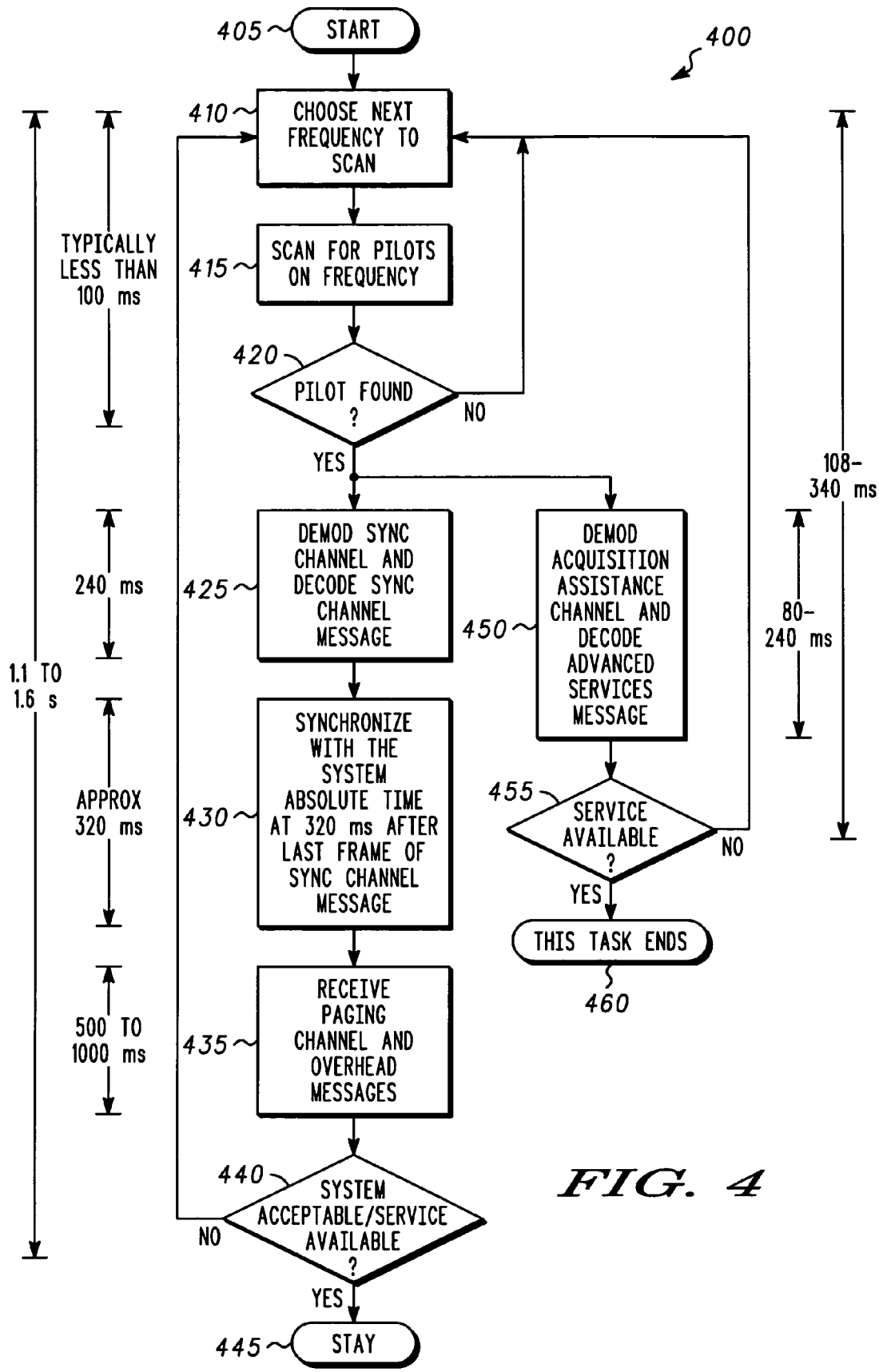
FIG. 4 is an exemplary flowchart illustrating the operation of the wireless communication device according to another embodiment.

FIG. 4 is an exemplary flowchart 400 illustrating the operation of the wireless communication device 200 according to another related embodiment interchangeable with the flowchart 300. In step 405, the flowchart begins. In step 410, the wireless communication device 200 can choose a next frequency to scan. If the wireless communication device 200 has just begun scanning frequencies, the next frequency can be the first frequency to scan. In step 415, the wireless communication device 200 can scan for pilots on the currently selected frequency. If there are no pilots found on the selected frequency in step 420, the wireless communication device 200 can choose a next frequency to scan in step 410. If a pilot is found in step 420, the wireless communication device 200 can start two processes, one beginning at step 425 and the other beginning at step 450. The wireless communication device 200 may alternately perform one process before the other.

In step 425, the wireless communication device 200 demodulates a synchronization channel and decodes a synchronization channel message. In step 430, if operating on a code division multiple access system, the wireless communication device 200 can synchronize with a current system with an absolute time set at 320 ms after the last frame of a synchronization channel message. According to another embodiment, the wireless communication device 200 can synchronize with other systems, such as a time division multiple access system, using alternate methods. In step 435, the wireless communication device 200 can receive paging channel and overhead messages on the current system. If the wireless communication device 200 determines the current system is acceptable based on the paging channel and overhead messages and determines that a desired service is available based on the other process starting at step 450, the wireless communication device 200 can stay on the current system in step 445. If not, the wireless communication device 200 can return to step 410 to choose a next frequency to scan. In step 450, the wireless communication device 200 can demodulate an acquisition assistance channel acquisition assistance channel and decode an advanced services message. In step 455, the wireless communication device 200 can determine if a desired service is available. If not, the wireless communication device 200 can select a next frequency or system in step 410. If the desired service is available, in 460, the wireless communication device 200 can continue the process starting in 425 to make the appropriate determination in step 440.

FIG. 4 also shows possible timing for each step. This timing is only shown to illustrate the timing that can be saved by performing concurrent processes at step 425 and 450 and at other steps. It is readily apparent that any useful or different timing can be used depending on the system the mobile communication device 200 is operating on.

The method of this invention is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method for system selection in a wireless communication device, the method comprising:
receiving a synchronization channel;
decoding a synchronization channel message received on the synchronization channel;

receiving an acquisition assistance channel;
decoding an advanced services information message received on the acquisition assistance channel; and
selecting a system based on the advanced services information message,
wherein receiving a synchronization channel and decoding a synchronization channel message are performed concurrently with receiving an acquisition assistance channel and decoding an advanced services information message.

2. The method according to claim 1, further comprising:
selecting a current channel;
acquiring a pilot channel; and
synchronizing to a pilot pseudorandom noise code.

3. The method according to claim 2, wherein selecting a system further comprises determining from the advanced services information message if a desired service is available on a current system.

4. The method according to claim 3, wherein selecting a system further comprises:
if a desired service is available on the current system and the current system can be used, selecting the current system for operation of the wireless communication device; and
if a desired service is not available on the current system, selecting another channel and repeating acquiring, synchronizing, receiving a synchronization channel, decoding a synchronization channel message, receiving an acquisition assistance channel, and decoding an advanced services information message.

5. The method according to claim 1, wherein the acquisition assistance channel is a different channel from the synchronization channel.

6. The method according to claim 1, wherein the acquisition assistance channel includes an encoded, interleaved, spread, and modulated signal.

7. The method according to claim 1, wherein the acquisition assistance channel includes an acquisition assistance channel superframe having three acquisition assistance channel frames.

8. The method according to claim 1, wherein the acquisition assistance channel includes an advanced services information message, the advanced services information message including at least one of a push-to-talk service availability, a broadcast multicast service availability, alternate network availability, and a list of service options available.

9. A wireless communication device comprising:
a transceiver configured to receive a synchronization channel and an acquisition assistance channel;
a controller coupled to the transceiver, the controller configured to control operations of the wireless communication device;
a synchronization channel module coupled to the controller, the synchronization channel module configured to decodes synchronization channel message received on the synchronization channel;
a acquisition assistance channel module coupled to the controller, the acquisition assistance channel module configured to decode an advanced services information message received on an acquisition assistance channel at least in part while the synchronization channel module is decoding the synchronization channel message; and
a system selection module coupled to the controller, the system selection module configured to select a system based on the advanced services information message.

10. The wireless communication device according to claim 9, wherein the controller is further configured to select a current channel, acquire a pilot channel, and synchronize to a pilot pseudorandom noise code.

11. The wireless communication device according to claim 10, wherein the system selection module is further configured to determine, from the advanced services information message, if a desired service is available on a current system.

12. The wireless communication device according to claim 11, wherein the system selection module is further configured to select the current system for operation of the wireless communication device if a desired service is available on the current system and the current system can be used, and if a desired service is not available on the current system, select another channel and instruct the wireless communication device to repeat acquiring, synchronizing, receiving a synchronization channel, decoding a synchronization channel message, receiving an acquisition assistance channel, and decoding an advanced services information message.

13. The wireless communication device according to claim 9, wherein the acquisition assistance channel is a different channel from the synchronization channel.

14. The wireless communication device according to claim 9, wherein the acquisition assistance channel includes an encoded, interleaved, spread, and modulated signal.

15. The wireless communication device according to claim 9, wherein the acquisition assistance channel includes an acquisition assistance channel superframe having three acquisition assistance channel frames.

16. The wireless communication device according to claim 9, wherein the acquisition assistance channel includes an advanced services information message, the advanced services information message including at least one of a push-to-talk service availability, a broadcast multicast service availability, alternate network availability, and a list of service options available.

17. The wireless communication device according to claim 9, wherein the synchronization channel module decodes the synchronization channel message concurrently with the acquisition assistance channel module decoding the advanced services information message.

18. The wireless communication device according to claim 9, wherein the synchronization channel module decodes the synchronization channel message separately from the acquisition assistance channel module decoding the advanced services information message.

19. A method for system selection in a wireless communication device, the method comprising:
selecting a current channel;
acquiring a pilot channel;
synchronizing to a pilot pseudorandom noise code;
receiving a synchronization channel;
decoding a synchronization channel message received on the synchronization channel;
receiving an acquisition assistance channel;
decoding an advanced services information message received on the acquisition assistance channel at least in part while decoding the synchronization channel message; and
selecting a system based on the advanced services information message,
wherein the acquisition assistance channel is a different channel from the synchronization channel.

20. A wireless communication device comprising:
- a transceiver configured to receive a synchronization channel and an acquisition assistance channel;
- a controller coupled to the transceiver, the controller configured to control operations of the wireless communication device;
- a synchronization channel module coupled to the controller, the synchronization channel module configured to decode a synchronization channel message received on the synchronization channel, the synchronization channel module further configured to decode an advanced services information message received on the synchronization channel at least in part while decoding the synchronization channel message; and
- a system selection module coupled to the controller, the system selection module configured to select a system based on the advanced services information message.

21. The wireless communication device according to claim 20, wherein the controller is further configured to select a current channel, acquire a pilot channel, and synchronize to a pilot pseudorandorn noise code.

22. The wireless communication device according to claim 21, wherein the system selection module is further configured to determine, from the advanced services information message, if a desired service is available on a current system.

* * * * *